Dec. 10, 1968  W. B. DEAN ETAL  3,415,092
APPARATUS FOR FORMING TUBING INTO HELICAL CONFIGURATION INCLUDING
A ROTATABLE MANDREL HAVING TRACK GUIDE MEANS
Filed April 5, 1967  5 Sheets-Sheet 1
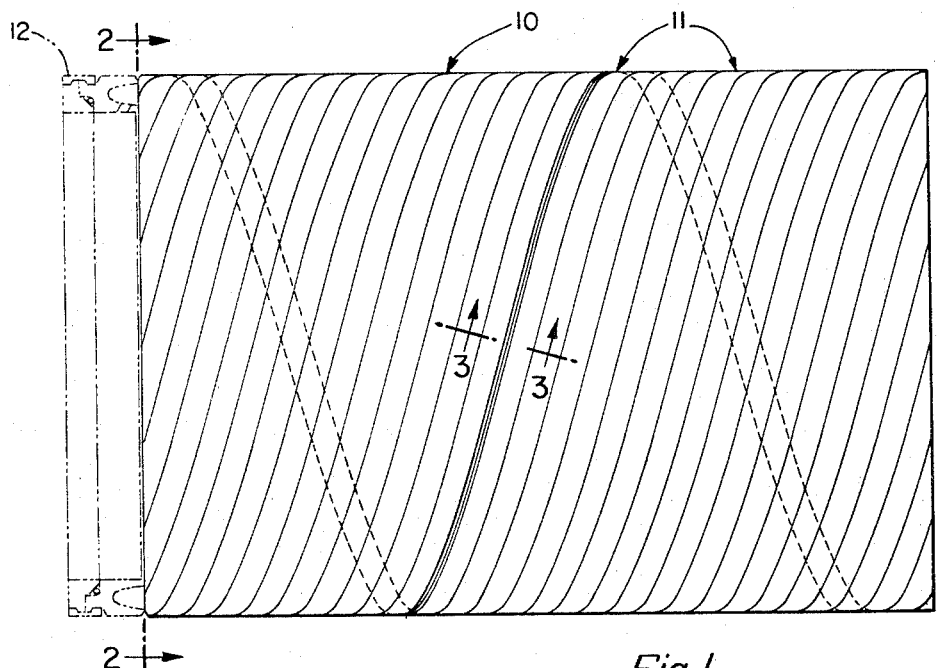
*Fig.1*
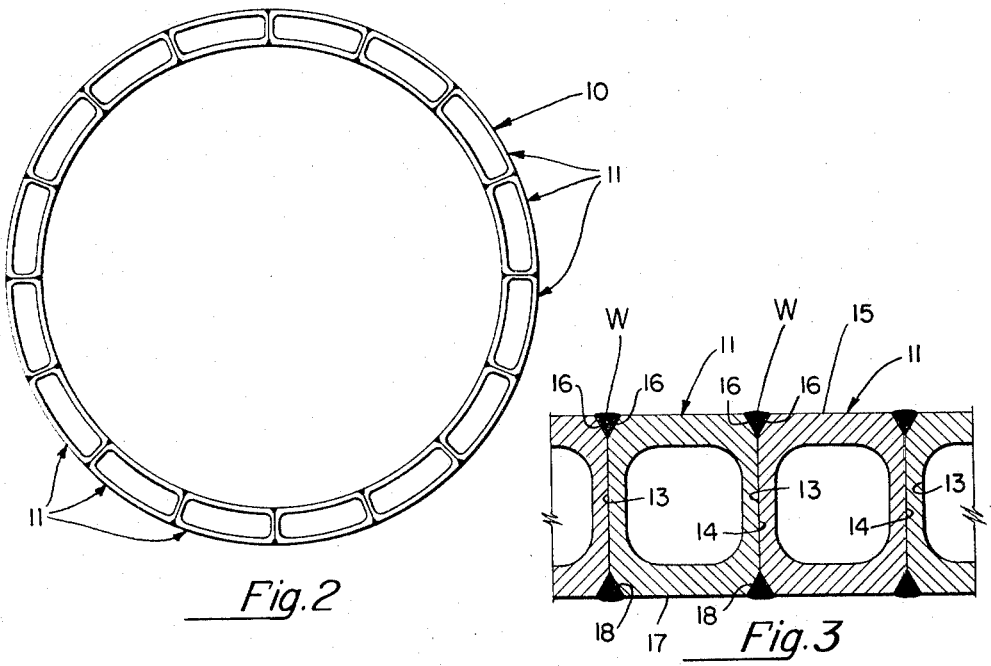
*Fig.2*  *Fig.3*
INVENTORS
WALTER B. DEAN
HARRY M. RUSSELL-FRENCH
BY
William R. Nolte
AGENT

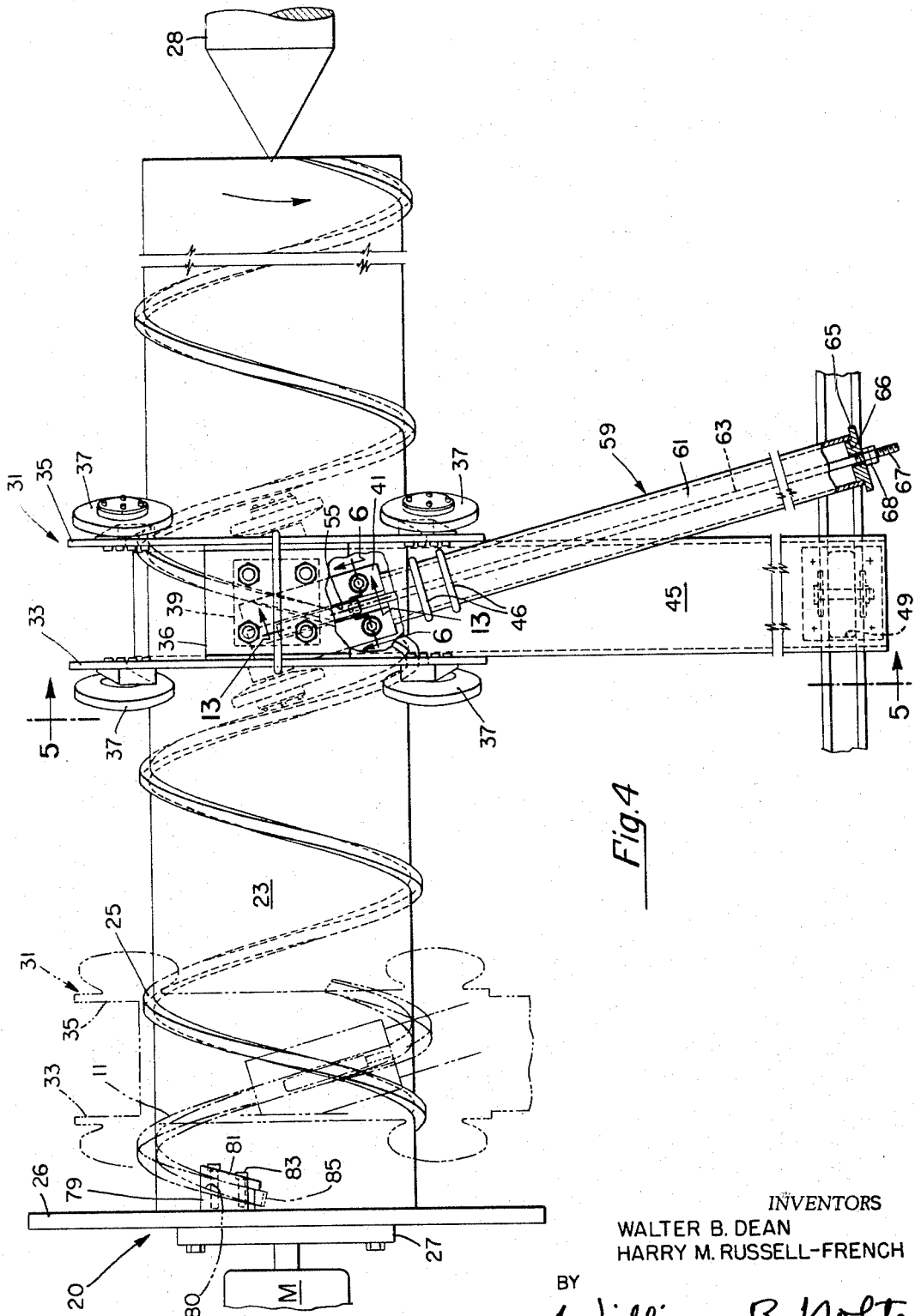

INVENTORS
WALTER B. DEAN
HARRY M. RUSSELL-FRENCH
BY William R. Nolte
AGENT

United States Patent Office 3,415,092
Patented Dec. 10, 1968

3,415,092
APPARATUS FOR FORMING TUBING INTO HELICAL CONFIGURATION INCLUDING A ROTATABLE MANDREL HAVING TRACK GUIDE MEANS
Walter B. Dean, Narberth, and Harry M. Russell-French, Philadelphia, Pa., assignors to The Budd Company, Philadelphia, Pa., a corporation of Pennsylvania
Filed Apr. 5, 1967, Ser. No. 628,580
1 Claim. (Cl. 72—144)

ABSTRACT OF THE DISCLOSURE

Apparatus for forming tubing into helical configuration. A mandrel having a projecting track of the required helix angle is secured to the outside surface of the mandrel. A carriage cooperates with a track to feed and wrap tubing around the forming surface of the mandrel.

The present invention relates to an improved method and apparatus for producing pressure vessels and more particularly, to a method for producing lengths of hollow section tubing bent in helical form and arranged together and joined in a manner to form a hollow container.

Most external pressure vessels are constructed from an outer shell of metal reinforced by strengthening ribs which are usually of rectangular cross-section. Other methods of making pressure vessels employ cast metal cylinders with or without strengthening ribs, and metal cylinders with externally attached strengthening ribs. Maximum vessel performance, efficiency, and strength capabilities are not possible with any of these constructions. Such structures usually are of excess weight and/or size, or their volumetric efficiencies detract from the performance of the vessels.

It is an object of this invention, therefore, to provide an improved method and apparatus for producing a pressure vessel which avoids one or more of the disadvantages of the prior art.

It is another important object of this invention to provide an improved article of manufacture in the form of a pressure vessel which is lighter and has greater strength than pressure vessels of the prior art.

It is another important object of this invention to enhance the performance of underwater vessels by providing new methods for the construction thereof which have greater strength and which enable substantial savings in weight.

A further important object of this invention is to provide a method and apparatus for producing a novel pressure vessel wherein a plurality of lengths of hollow tubing are first coiled into helical configuration, stacked together in abutting relation and subsequently formed together as by welding to produce a pressure vessel having all the strength due to the twist given the individual lengths, thereby producing a vessel much stronger than in those cases in which the fibers of the individual elements run in a single direction only.

For a better understanding of the present invention together with other and further objects thereof, reference is had to the following description taken in connection with the accompanying drawing and its scope will be pointed out in the appended claim.

In the drawing,

FIG. 1 is a plan view of the novel pressure vessel of the present invention.

FIG. 2 is an end elevational view taken along the line 2—2 of FIG. 1.

FIG. 3 is a sectional view taken along the line 3—3 of FIG. 1, showing the hollow section of the tubing utilized to form the pressure vessel.

FIG. 4 illustrates the apparatus of the present invention shown partially in section for bending the lengths of hollow tubing into helical configuration;

Figure 5:
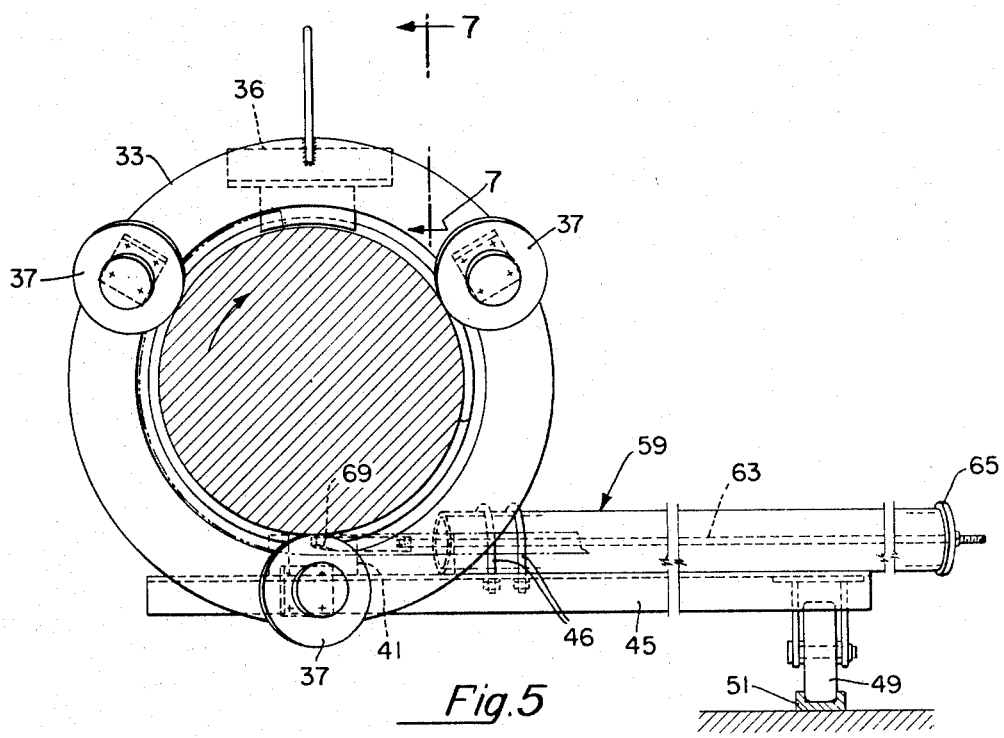
FIG. 5 is a vertical sectional view of the apparatus taken along the line 5—5 of FIG. 4.

Referring now to the drawings and more particularly to FIG. 1 there is shown an improved pressure vessel 10 in accordance with the present invention, having a plurality of lengths of hollow tubing 11. The ends of the hollow tubing are received in a joint ring or end fitting 12, the latter shown in phantom, and forming no part of the present invention. The lengths of tubing define helixes and are arranged together to define a cylinder having the appearance of a multistart thread or worm gear.

With reference to FIG. 3 the tubular elements 11 are of rectangular hollow cross section and opposed outer sidewall faces 13, 14 of each element are in abutting engagement with opposed faces of the next adjacent elements. Each tubular element includes an outer cylindrical face 15 which is bevelled along its side margins as at 16, and an inner cylindrical face 17 likewise bevelled along its side marginal edges as at 18. The bevelled edges of adjacent abutting elements define V-grooves into which weld material W is received to secure the elements together to produce a pressure vessel having unusual strength and weight characteristics.

With reference now to FIG. 4 there is shown an apparatus 21 for forming the tubular elements 11 into helical shape. The forming machine comprises a cylindrical mandrel 23 the outside diameter of which is approximately the same as the inside diameter of the finished cylinder 10 which is to be formed. A rectangular thread constituting a track 25 of the required helix angle is integrally secured to the outside periphery of the mandrel. One end of this mandrel is secured to an end plate 26 which is suitably mounted upon a face plate 27 which is connected to a source of rotative power M for rotating the mandrel about its axis. The opposite end of the mandrel 23 may be suitably supported as by a centering pin 28, and said opposite end further being free of any obstruction which might impede the removal of the tubular helical strip 11.

A carriage 31, consisting of two spaced apart annular rings 33, 35 of greater inside diameter than the outside diameter of the mandrel 23, are disposed in concentric relationship therewith by means of a plurality of wheels 37 equally spaced around the wheel center pitch circle. The wheels 37 bear on the outside surface of the mandrel and are inclined relative to the axis of the mandrel at an angle corresponding to the angle of inclination of helix thread 25 and serve to provide proper tracking on the mandrel surface. The wheels 37 upon rotation of the mandrel 23 enable the carriage to move axially along the mandrel and may be provided with suitable adjustment to assure proper fit on the mandrel surface.

Figure 7:
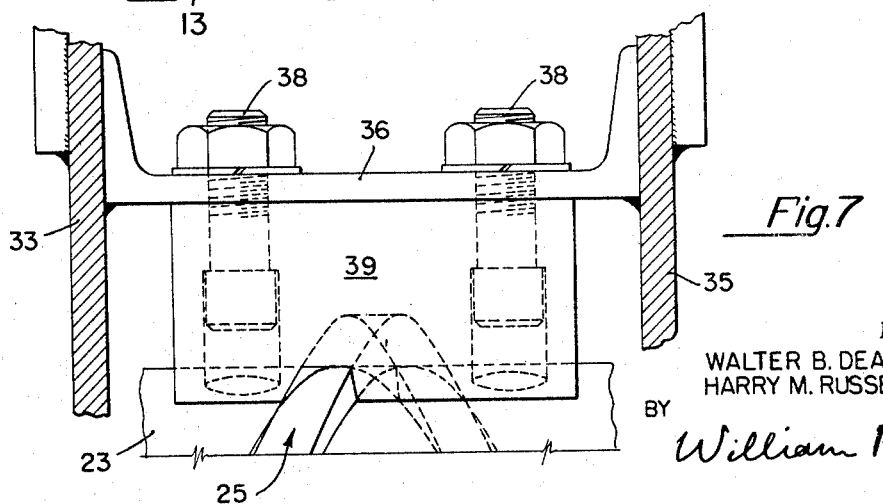
FIG. 7 is a vertical elevational view along line 7—7 of FIG. 5 illustrating the guide block which rides on the helix of the mandrel so as to traverse the carriage therealong.

As seen in FIGS. 5 and 7, the annular rings 33, 35 are separated and secured above by a channel member 36 to which is fastened a carriage guide block 39 by bolts 38. The guide block rides the helix thread member 25 protruding outwardly from the periphery of the mandrel so as to traverse the carriage along the mandrel 23 when the mandrel is rotated. A tube forming block 41 is secured as by bolts 43 to the top surface of channel torque arm 45 between the annular rings 33, 35 at a location diametrically beneath the carriage guide block 39. The forming shoe is so positioned that it supports the bottom and side surfaces of the rectangular tube element 11 and urges the top surface thereof into engagement with the mandrel. As the mandrel rotates and the carriage advances along its axis the workpiece 11 is wrapped around the mandrel adjacent the raised portion of the thread 25. The torque arm 45 provides the necessary torque reaction for the forming block 41 during its wrapping action of hollow workpiece 11 about mandrel 23. In FIG. 5, the channel member 45 is shown extending tangentially from the lower outer peripheral portions of the carriage rings 33, 35. A wheel 49 is suitably mounted to the outer end of the torque 45 and is received in a stationary track 51 which is disposed parallel to the axis of the mandrel.

Figure 6:
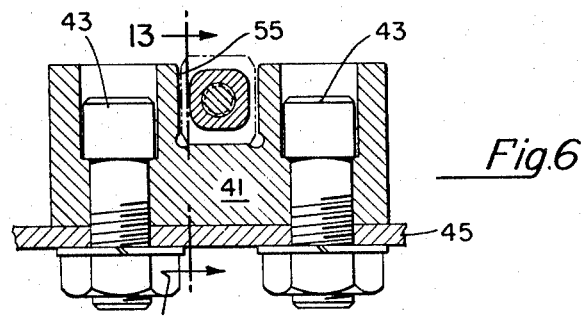
FIG. 6 is a vertical sectional view taken along the line 6—6 of FIG. 4 showing through the forming block of the apparatus.

Referring further to FIGS. 4 to 6 inclusive, it is noted that the forming block 39 includes an elongated groove 55 disposed centrally along its length. The groove has height and width dimensions and is disposed between the mandrel 23 and reaction arm 45 in a manner to cause the length of hollow tubing 12 to be wrapped around the mandrel 23. As seen in FIG. 4, the axis of the groove 55 of forming block 41 is disposed at an angle to the axis of the mandrel 23 which corresponds to the angle of the helix thread 25 of the mandrel.

Figure 13:
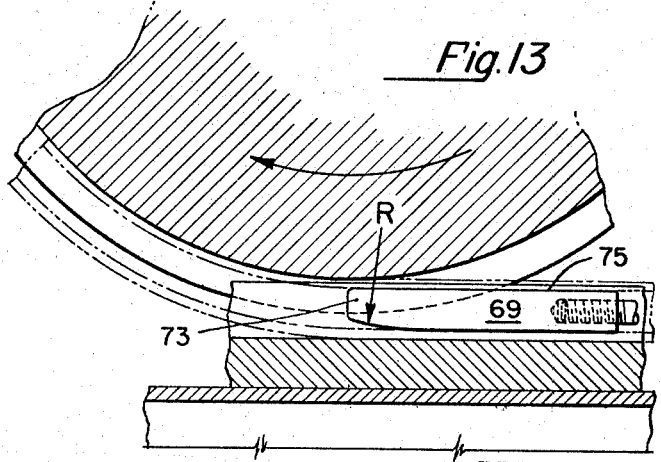
FIG. 13 is a view taken along the line 13—13 of FIG. 6 showing the construction of the forming finger used in conjunction with the mandrel.

In order to provide support for the rectangular tubing 12 while the same is being wrapped around the mandrel 23, tube support means 59 consisting of a hollow cylindrical tube 61 having a rod 63 concentrically located therein is carried by reaction support arm 45 by U-bolts 46. An end cap 65 having a shoulder portion 66 received within the bore of the cylindrical tube supports one end of the rod which is threaded as at 67. The workpiece or tube which is to be formed is slid over the outside of the rod. A pair of adjustment nuts 68 limit the axial position of the rod within the tube and determine the tension in the tube which is being wrapped around the mandrel. In order to prevent collapse of the tube as the same is bent around the mandrel 23, a finger member 69 is secured as by threaded engagement to the opposite end of the rod. As seen in FIGS. 5 and 13, the lower portion of the finger member 69 is curved as at radius 3 to provide relief as the bending stresses are applied to the workpiece. The tip of the finger indicated by reference numeral 73 terminates the vertical centerline of the mandrel while the top surface of the finger 75 is disposed in tangential relationship to the lower peripheral surface of the mandrel.

In order to anchor the workpiece 11 to the mandrel, FIG. 4, to enable the same to be bent therearound, an anchor block 79 having an inclined surface 80 corresponding to the pitch angle of the helix of the thread 25 is integrally secured to the face plate 26 and to the outer periphery of mandrel 23. A clamping plate 81 with associated screws 83 serve to secure the lead end 85 of the workpiece of 12 to the block.

In operation the carriage 31 mounted for axial movement relative to the rotation of forming mandrel 41, is positioned to the extreme left of the mandrel as seen by its phantom line position thereof. A suitable length of rectangular tubing 12 is slipped over along the length of rod 63 of the support 59 by first removing the pair of nuts 68 from the rod and the cap plate 65 from sleeve 61. The lead end portion of the tube 11 is passed over and beyond the finger member 69 to overhang the latter and is then deformed to assume the curvature of the mandrel 23. The aforementioned lead end portion 85 of workpiece 11 is then clamped to the inclined surface 80 of the anchor block 79 by means of clamping plate 81 and screws 83. As shown in FIG. 6 the portion of the tube enveloping the finger member 69 is likewise received within groove 55 of forming block 41. As the mandrel is rotated in the direction of the arrow as indicated, the workpiece 11 is withdrawn past the forming finger and wrapped around the mandrel to assume its shape. The carriage 31 by means of guide block 39, which rides on the helical thread 25 of the mandrel, induces axial movement of the carriage and causes the hollow workpiece 12 which is being wound around the mandrel to be laid down between the raised helical thread portions 25. Upon reaching the extreme right hand side of the mandrel, the carriage 33 may be suitably lifted or removed from the end of the mandrel. Thereafter the length of tubing so formed on the mandrel may be removed by a reverse threading motion applied to the tube.

Figure 8:
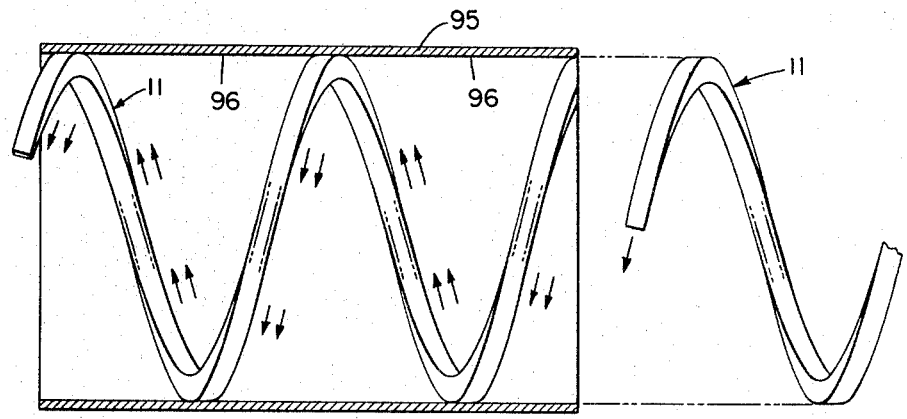
FIG. 8 illustrates a plurality of helically formed elements being placed inside a welding fixture prior to having adjacent elements welded together.

With reference now to FIG. 8 there is shown a welding fixture 95 in the form of an open ended cylinder. Its inside diameter is the same size as the outside diameter of the pressure vessel which is to be fabricated and corresponds to the outside diameter of the tubular workpiece 11 formed by the above described forming operation about mandrel 23. A plurality of workpieces 11 which have been formed on the mandrel are stacked together inside the assembly fixture 95 in side-by-side relationship. This is done by screwing in one element 11 between adjacent elements until the desired number of elements are in place and loosely fill the fixture 95. Thereafter clamping means comprising an end plate 97 at one end of the cylinder, an annular ring 98 at the opposite end thereof, and a plurality of bolt elements 99 are tightened in a manner to cause axial pressure to be applied to the helical workpiece 11. This compressive action causes the workpieces to expand against the inside wall 96 of the fixture 95. The fixture 95 is then fastened to the aforementioned face plate 27 used to apply rotation to mandrel 23 by securing plates 97 and 27 together by means of bolts 103.

With the spiral tubular sections 11 so pressed together welding means 105 are provided to apply weld material in the grooves formed between adjacent sections 11. For this purpose the welding means include a welding torch 107 mounted upon a boom 109.

Figure 9:
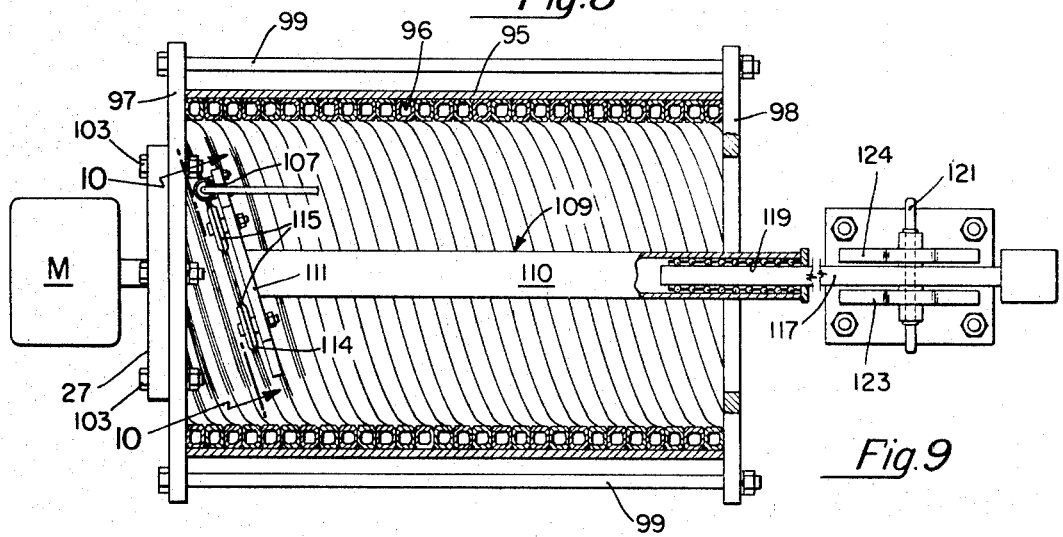
FIG. 9 illustrates a plan view partially in section of welding apparatus advanced interiorly of the welding fixture to weld adjacent elements together.
Figure 11:
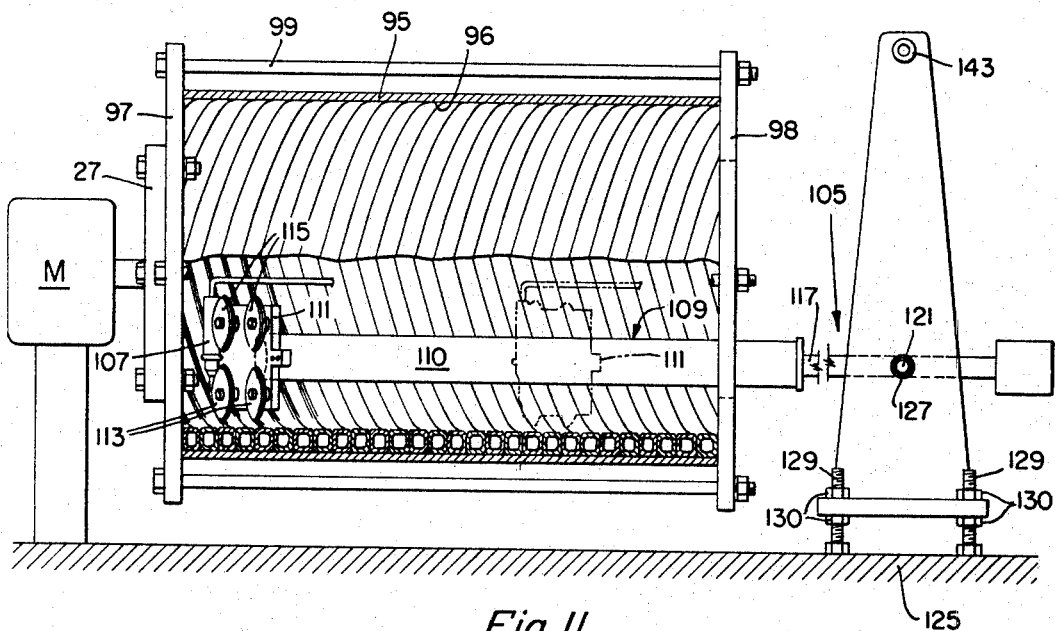
FIG. 11 illustrates a front elevational view partially in section of the apparatus shown in FIG. 9.
Figure 10:
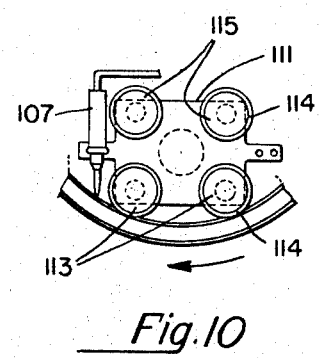
FIG. 10 is a view taken along the line 10—10 of FIG. 9 showing the welding torch being guided in the seams formed by abutting spirally formed elements.

As seen in FIGS. 9 and 11, the boom 109 is disposed interiorly of the welding fixture 95 along an axis generally parallel to the axis of the cylinder. The boom 109 carries a head 111 in the form of a plate having pairs of wheels 113, 115 mounted for rotation along top and bottom margins thereof. The pairs of wheels 113, 115 are respectively adapted to ride in the V-grooves adjacent the inner and outer peripheries of the tubular members 11 of the cylinder to be fabricated. The wheels each have a periphery of complemental V-shaped, cross sections indicated by reference number 117 to so ride in the V-grooves. Moreover as best seen in FIG. 9, the plate 111 is inclined to the axis of the cylinder 95 an amount equal to the helix angle of the elements stacked therein.

In order to provide axial travel of the welding head plate 111 so that adjacent helical sections may be welded together upon rotation of the fixture 95 by the rotation means M, the boom 109 comprises an outer sleeve member 110 within which is received a shaft 117. Linear motion bearing means 119 enable axial movement of sleeve 110 relative to shaft 117. The shaft 117 is mounted for pivotal movement about a horizontal axis transverse to its axis by means of pivot shaft 121. The outer ends of the pivot 121 are suitably supported by upright base segments 123, 124 extending upwardly from a fixed support 125. The ends of pivot 121 may be secured in bearing apertures as at 127 to facilitate welding interiorly of the welding fixture 95. The base segments are shown secured to the fixed support 125 by means of bolts 129 having nuts 130 which may be suitably rotated to obtain the desired height of welding boom 109. A counterweight CW is affixed to the outer end of shaft 117 to facilitate appropriate tilting action of the boom 109.

In operation the guide wheels 113 mounted on head plate 111 are positioned to ride in the V-grooves formed by adjacent tubular strips 11 as seen in FIG. 11. In this position the welding tip of the welding torch 107 is spaced opposite the same groove in which the wheels 113 ride so that it can automatically weld adjacent helical strips together. Upon rotational movement of the mandrel 23 in the direction as indicated by the arrow in FIG. 12 and with activation of the welding equipment, weld material W is caused to be deposited in the V-groove. Since the sleeve member 110, of boom 109, includes the anti-friction linear motion bearings 119, the welding head 111 can freely follow the V-guide and move axially relative to the shaft 117. In order to better equalize the weld stresses, the weld pattern may be such as skip from one helix V-groove to another approximately diametrically opposite helix until all of the helix V-grooves are filled with weld material.

Figure 12:
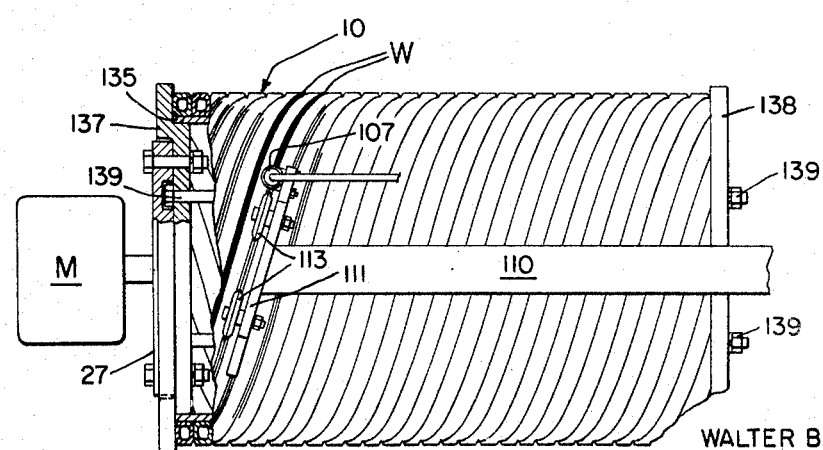
FIG. 12 is a plan view of certain of the apparatus illustrated in FIG. 9 to indicate the manner by which adjoining external surfaces of the elements are welded together.

After completion of all of the welding of the internal V-grooves, the cylindrical pressure vessel 10 so formed may be removed from the welding fixture 95 and placed on a second welding fixture 135 as seen in FIG. 12 for welding of its exterior grooves. The outside diameter of the latter fixture corresponds to the inside diameter of the pressure vessel 10. Clamping plates 137, 138 apply axial pressure to squeeze the ends of the cylinder by means of bolts 139 which extend between the plates. Clamping plate 137 in turn is secured to the previously referred to rotatable face plate 27 driven by motor M, and by bolts 141. Since the external grooves formed by adjacent tubular elements 11 are oppositely inclined a like amount as the grooves interiorly of the vessel, it is necessary that the boom 109 be turned upside down so that the upper set of wheels 115, see FIG. 13, are caused to ride in the external grooves. Moreover, in this position the previously referred transverse pivot shaft is moved to the upper bearing location 143 of base supports 123, 124 as seen in FIG. 11. In this manner the same welding torch carriage means 109 would be set up to do the external welds upon the pressure vessel in the same manner as for the internal welds.

While there has been described what at present is considered to be the preferred embodiment of this invention, it will be obvious to those skilled in the art that various changes and modifications may be made therein without departing from the invention, and it is therefore aimed in the appended claim to cover all such changes and modifications as fall within the true spirit and scope of the invention.

What is claimed is:

1. Apparatus for forming a length of tubing into a spiral form, comprising an elongated mandrel having an external forming surface, helical track means extending from said forming surface, means for rotating said mandrel, anchor means mounted on said mandrel for securing one end of said length of tubing to said mandrel, carriage means associated with said mandrel for axial movement therealong, said carriage means including ring means encircling said mandrel, roller means journalled for rotation on said ring means and coacting with said forming surface, guide means secured by said ring means and engaging said track means, torque arm reaction means secured to said ring means, tube forming means mounted on said torque arm means to receive said hollow tubing and to conform the same to said forming surface of said mandrel, and tube support and feed means aligned with said forming means and supported on said torque reaction means.

References Cited
UNITED STATES PATENTS

| | | | |
|---|---|---|---|
| 1,075,045 | 10/1913 | Lewis | 72—144 |
| 1,210,894 | 1/1917 | Brinkman | 72—144 X |
| 2,094,204 | 9/1937 | Carter et al. | 72—142 |
| 2,697,868 | 12/1954 | Arant | 72—135 X |
| 2,771,934 | 11/1956 | Payne | 72—144 X |

MILTON S. MEHR, *Primary Examiner.*